United States Patent [19]

Schmidt et al.

[11] Patent Number: 4,663,132

[45] Date of Patent: May 5, 1987

[54] METHOD OF PROCESSING SODIUM OXALATE FORMED DURING THE DIGESTION OF BAUXITE

[75] Inventors: Hans-Werner Schmidt, Frankfurt am Main; Walter Koch, Mühlheim am Main; Martin Hirsch, Friedrichsdorf; Karlheinz Rosenthal, Neu-Isenburg, all of Fed. Rep. of Germany; Yilmaz Yetmen, Corpus Christi, Tex.

[73] Assignee: Metallgesellschaft AG, Frankfurt am Main, Fed. Rep. of Germany

[21] Appl. No.: 713,433

[22] Filed: Mar. 19, 1985

[30] Foreign Application Priority Data

Mar. 28, 1984 [DE] Fed. Rep. of Germany ....... 3411415

[51] Int. Cl.$^4$ .............................................. C01F 7/04
[52] U.S. Cl. .................................. 423/119; 423/121; 423/130
[58] Field of Search ...................... 423/119, 121, 130

[56] References Cited

U.S. PATENT DOCUMENTS 4,038,039 7/1977 Carruthers et al. ................. 423/130
4,280,987 7/1981 Yamada et al. ...................... 423/121

*Primary Examiner*—H. T. Carter
*Attorney, Agent, or Firm*—Felfe & Lynch

[57] ABSTRACT

In a method of processing contaminated sodium oxalate which becomes available in a separating stage succeeding the digestion of bauxite in accordance with the Bayer process, chemicals used in the digesting process are recovered in that moist sodium oxalate which has been separated is dried with the hot exhaust gases from a rotary kiln jointly with aluminum hydroxide or aluminum oxide hydrate and/or reactive alumina at a mole ratio of aluminum to sodium of at least 0.8 and the dried product is decomposed in said rotary kiln at a temperature of 780° to 1000° C. to form sodium aluminate. Suitably drying is effected by spray drying in direct contact with the exhaust gases of the rotary kiln and decomposition is effected at a temperature in the range from 850° to 950° C. and with an Al:Na ratio not in excess of 1.2.

8 Claims, 1 Drawing Figure

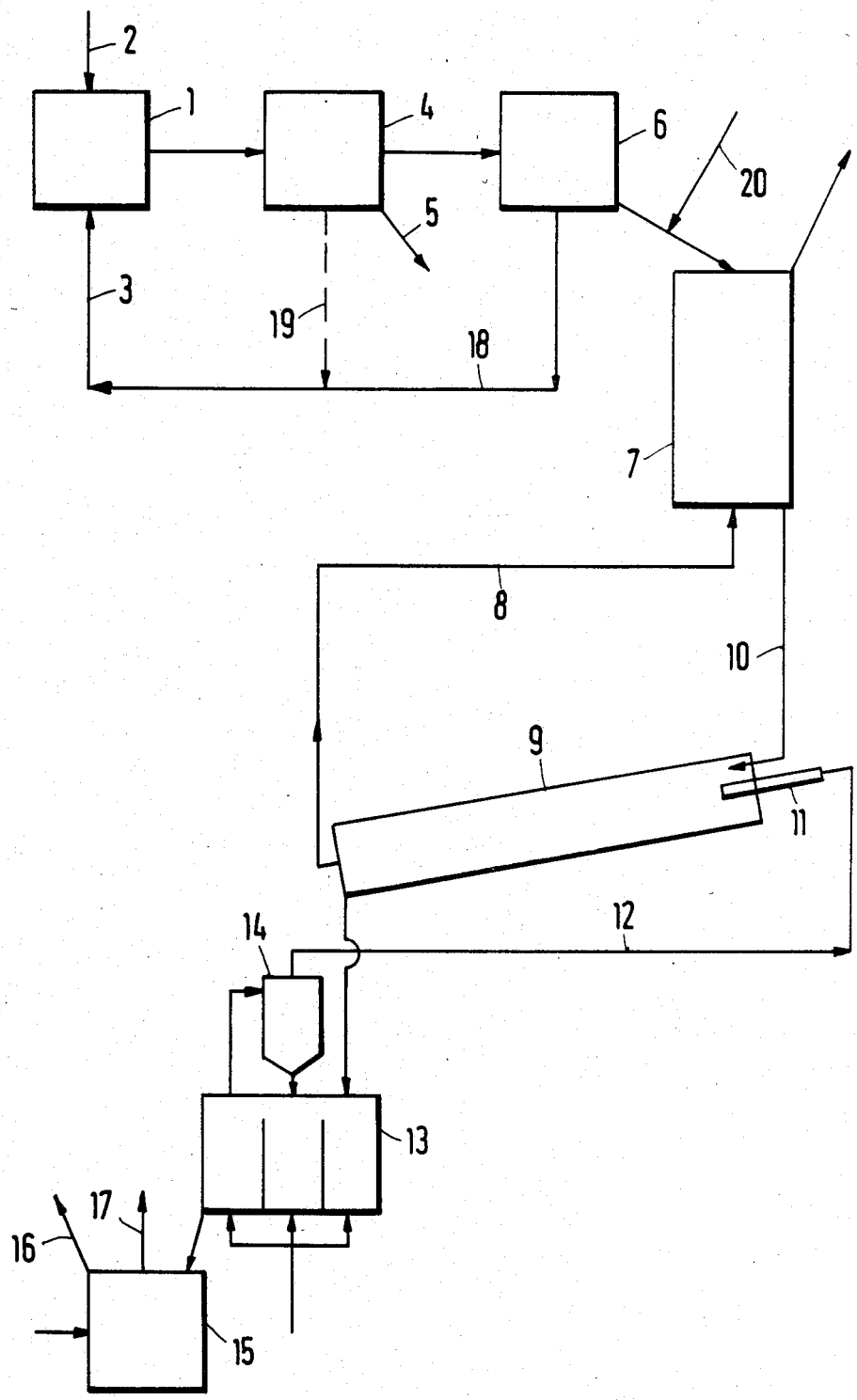

METHOD OF PROCESSING SODIUM OXALATE FORMED DURING THE DIGESTION OF BAUXITE

BACKGROUND OF INVENTION

This invention relates to a method of processing contaminated sodium oxalate which becomes available in a separating stage succeeding the digestion of bauxite in accordance with the Bayer process.

Numerous bauxites contain organic substances so that the digestion of such bauxites in accordance with the Bayer process results in the formation of sodium oxalate, which is progressively enriched in the circulating extracting solvent. When a certain concentration of sodium oxalate has been exceeded, the latter will adversely affect the crystallization of aluminum hydroxide so that a higher proportion of fine-grained product will be formed during the subsequent calcination. Besides, the results of the filtration of the crystalline aluminum hydroxide are much less satisfactory.

In view of the facts outlined above, the sodium oxalate must be removed at least in part from the circulating extraction solvent. This can be effected, e.g., by an oxidizing decomposition effected by a treatment with oxygen or oxygen-containing gases under elevated pressure and at elevated temperature (Published German Application No. 29 45 152). That treatment takes a time of 30 to 60 minutes and requires highly expensive equipment.

Alternatively, sodium oxalate can be removed from the circulating extraction solvent by crystallization. But that practice requires a separation or further processing which is expensive and often results in products which cannot be used in the production of alumina. For instance, the sodium oxalate which is initially obtained can be reacted with milk of lime to form calcium oxalate and sodium hydroxide solution, which is recycled to the extraction process (U.S. Pat. No. 3,649,185). In another process, calcium oxalate precipitated by a treatment with milk of lime is reacted with sulfuric acid so that oxalic acid is formed (Published German Application No. 25 53 870).

It is an object of the invention to provide a method for the processing of the oxalate formed by digestion according to the Bayer process which can be integrated in the digesting process and involves only a low expenditure.

SUMMARY OF THE INVENTION

This object is accomplished in that the process of the kind described first hereinbefore is carried out in accordance with the invention in such a manner that the moist sodium oxalate, which has been separated, is dried with the hot exhaust gases from a rotary kiln jointly with aluminum hydroxide or aluminum oxide hydrate and/or reactive alumina at a mole ratio of aluminum to sodium of at least 0.8. The dried product thus obtained is decomposed in the rotary kiln at a temperature of 780° to 1000° C. to form aluminate.

Reactive alumina is an oxide which participates in the required reactions under the selected reaction conditions.

The sodium oxalate to be processed in accordance with the invention is accompanied by aluminum hydroxide and adhering extraction solvent. The mix, which is fed to the drying stage, must previously be adjusted to a mole ratio of at least 0.8 of aluminum to sodium. This can be accomplished in that the separation or crystallization of sodium oxalate and the previous separation or crystallization of aluminum hydroxide are suitably controlled relative to each other. If the crystallized sodium oxalate is not accompanied by an adequate quantity of aluminum, the additional aluminum which is required can be admixed as crystalline aluminum hydroxide, which may have been crystallized before, or as crystalline aluminum oxide hydrate and/or as reactive alumina. In the determination of the aluminum requirement it is necessary to take the sodium content of the crystallized sodium oxalate into account as well as the sodium content contained in the adhering extraction solvent, particularly of the sodium hydroxide solution.

When the required mole ratio has been adjusted, the filter cake usually containing 25 to 40 wt. % adhereing moisture is dried by means of the hot exhaust gases from a rotary kiln. That drying can generally be carried out with any equipment which can be used to treat high-moisture streams of solids.

In particularly preferred embodiments of the invention, the moist solids are dried in direct contact with the exhaust gases from the rotary kiln, particularly in a spraying process. In the latter case the moist solids can be suitably charged by means of a rotating atomizing disc into the spray-drying tower.

The dried product is directly fed into the rotary kiln, wherein sodium oxalate is decomposed with formation of sodium aluminate by a reaction with the accompanying aluminum hydroxide or partly dehydrated aluminum hydroxide. Regardless of the quantity of aluminum which is available, there will be no clogging at temperatures up to 830° C. so that a satisfactory operation of the rotary kiln can be expected. On the other hand, certain quantities of sodium carbonate may be formed at relatively low temperatures resulting in a loss of sodium ions required in the digesting process. At temperatures above 830° C. the process in accordance with the invention is more sensitive and will require the presence of an adequate quantity of aluminum. It can be stated in general that higher aluminum contents permit higher temperatures in the rotary kiln. Higher temperatures, e.g., above about 850° C., afford the advantage that sodium carbonate formation is negligible and any existing sodium carbonate will react to form sodium hydroxide and/or sodium aluminate.

In accordance with a preferred further feature of the invention, sodium oxalate is decomposed at a temperature in the range from 850° to 950° C. and the mole ratio of aluminum to sodium is maintained at or below 1.2. This will avoid a loading of the processing stage with aluminum which is not required for the reaction and in an excessive dilution of the sodium aluminate with alumina. For instance, the sodium carbonate content will then reliably be less than about 4 wt. % and the sodium aluminate content will be between about 60 and 85 wt. %.

The rotary kiln has the usual design and mode of operation. The hot gases and the solids are preferably co-currently contacted in the rotary kiln in order to obtain a satisfactory monitoring of the temperature and a rapid heating of the dried solids. The latter is important to ensure that the temperature range in which sodium carbonate forms is passed through quickly.

The invention affords a number of advantages including that no products are formed which are alien to the process of producing alumina and which would have to be used for different purposes or to be dumped so that they would pollute the environment. Most of the aluminum hydroxide required for the reaction with the sodium oxalate is recycled to the process of producing alumina as soluble sodium aluminate. In the preferred embodiment of the invention using reaction temperatures above 850° C., active sodium hydroxide or sodium aluminate is even formed from the sodium carbonate, which is not active in the extraction process.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The drawing is a flow diagram schematically depicting the process in accordance with the invention.

DESCRIPTION OF PREFERRED EMBODIMENT

Referring to the drawing, a digesting reactor 1, preferably in the form of a tubular reactor, is fed with bauxite through line 2 and with extraction solvent through line 3. After an adequate treatment time the extraction solvent enters the agitating separator 4, in which aluminum hydroxide is separated and discharged by a device 5. Sodium oxalate is separated in the unit 6, e.g., by a sufficiently intense evaporation, and is charged together with adhering liquid extraction solvent into the dryer 7, which is preferably a spray dryer. Spray dryer 7 is supplied through line 8 with hot exhaust gas from rotary kiln 9. The dry product is supplied through line 10 directly into the rotary kiln 9, the burner 11 of which is supplied through line 12 with oxygen-containing gas from the succeeding fluidized bed cooler 13. After an adequate dwell time, the solids are withdrawn from the rotary kiln 9 and are cooled in the fluidized bed cooler 13. This is effected by means of oxygen-containing fluidizing gas which is introduced into the fluidized bed cooler 13 via line 21 and—after passage—is supplied to the rotary kiln 9 in the manner described hereinbefore. Before entering the rotary kiln 9, the stream of fluidizing gas is passed through a cyclone separator 14 for a removal of substantially all dust.

The stream of cooled solids then enters a container 15, in which it is slurried with extraction solvent. The two phases of the slurry are subsequently processed further in a suitable manner and/or are supplied (in lines 16 and 17) to the appropriate process stages.

Solvents separated in the separator 6 is recycled in line 18 to the digesting reactor 1. Part of the solution from which aluminum hydroxide has been removed can be by-passed around the separator 6 in a line 19. If the crystal sludge formed in the separator 6 does not have an adequate aluminum content in the form of adhering solution or crystallized aluminum hydroxide, aluminum hydroxide can be added, e.g., from discharge device 5 through feeder 20.

EXAMPLE 1

The pregnant solution leaving the agitating separator 4 is evaporated in the separator 6 to form filter cake at a rate of 4500 kg/h. That filter cake consists of
26 wt. % of sodium oxalate (calculated as $Na_2C_2O_4$)
34 wt. % aluminum hydroxide (calculated as $Al(OH)_3$)
40 wt. % adhering pregnant solution The pregnant solution contains
82 g/l sodium aluminate (calculated as $NaAlO_2$)
107 g/l sodium hydroxide (calculated as NaOH)
13 g/l sodium carbonate (calculated as $Na_2CO_3$)
918 g/l water The filter cake has an Al:Na mole ratio of 0.88 and is fed to a spray dryer 7 together with a sludge, which has been formed in the gas-purifying plant of the exhaust of the spray dryer and is supplied at a rate of 600 kg/h. In the spray dryer, drying is effected with gases at 1000° C. which come from the succeeding rotary kiln. The gas rate is 4800 sm$^3$/h. Exhaust gas is withdrawn from the spray dryer 7 at a temperature of about 280° C. and at a rate of 7000 sm$^3$/h.

Solids at a temperature of 216° C. become available in the spray dryer at a rate of 3086 kg/h and are supplied in line 10 to the rotary kiln 9. The rotary kiln 9 is heated by the combustion of fuel oil having a calorific value of 40 MJ/kg and supplied to the burner 11 at a rate of 237 kg/h. The fluidizing gas is at a temperature of 416° C. and is fed to the burner 11 through line 12 at a rate of 3530 sm$^3$/h.

A temperature of 900° C. is obtained in the rotary kiln 9. Exhaust gas is withdrawn from the rotary kiln at a rate of 4800 sm$^3$/h and has the following composition:
60.7 vol. % $N_2$
2.2 vol. % $O_2$
16.0 vol. % $CO_2$
21.1 vol. % $H_2O$ Product at a rate of 1890 kg/h is withdrawn from the rotary kiln 9 and supplied to the fluidized bed cooler 15 and is cooled in the latter to 205° C. by means of fluidizing air.

The product composed of:
80 wt. % sodium aluminate (calculated as $NaAlO_2$)
3.5 wt. % sodium carbonate (calculated as $Na_2CO_3$)
8.0 wt. % sodium hydroxide (calculated as NaOH)
8.5 wt. % alumina (calculated as $Al_2O_3$)
is slurried in the container 15 with extraction solvent supplied at a rate of 47 m$^3$/h and is separated by filtration into a liquid phase and a solid phase consisting mainly of alumina.

EXAMPLE 2

The filter cake to be processed has the following composition:
23.3 wt. % sodium oxalate (calculated as $Na_2C_2O_4$)
36.7 wt. % aluminum hydroxide (calculated as $Al(OH)_3$)
40 wt. % adherent pregnant solution The Al:Na mole ratio is 1.03.

Under the same conditions as in Example 1, a product is obtained which is composed of:
70 wt. % sodium aluminate (calculated as $NaAlO_2$)
3.5 wt. % sodium carbonate (calculated as $Na_2CO_3$)
8.0 wt. % sodium hydroxide (calculated as NaOH) and
18.5 wt. % alumina (calculated as $Al_2O_3$)

It will be understood that the specification and examples are illustrative but not limitative of the present invention and that other embodiments within the spirit and scope of the invention will suggest themselves to those skilled in the art.

We claim

1. A method of processing contaminated sodium oxalate which becomes available in a separating stage succeeding the digestion of bauxite in accordance with the Bayer process, comprising drying the separated sodium oxalate with hot exhaust gases from a rotary kiln jointly with aluminum hydroxide or aluminum oxide hydrate and/or reactive alumina at a mole ratio of aluminum to sodium of at least 0.8 to form a dried product; and decomposing the dried product in said rotary kiln at a temperature of 780° to 1000° C. to form sodium aluminate.

2. The method of claim 1, wherein the drying is effected by direct contact with the exhaust gases of the rotary kiln.

3. The method of claim 2, wherein the drying is effected by spray drying.

4. The method of claim 1, wherein the dried product is decomposed in the kiln at a temperature in the range of 850° to 950° C.

5. The method of claim 1, wherein the mole ratio of Al:Na in the sodium oxalate to be dried is in the range of 0.8 to 1.2.

6. The method of claim 1, wherein the mole ratio of Al:Na in the sodium oxalate to be dried is adjusted to a range of 0.8 to 1.2.

7. The method of claim 1, wherein the dried product is decomposed in the rotary kiln by contact with hot gases therein, said product and hot gases being co-currently contacted.

8. A method of processing Bayer process liquor contaminated with sodium oxalate comprising:
   processing Bayer process liquor to obtain a filter cake containing sodium oxalate;
   drying the filter cake with hot exhaust gases from a rotary kiln jointly with aluminum hydroxide or aluminum oxide hydrate and/or reactive alumina at a mole ratio of aluminum to sodium of at least 0.8 to form a dried product; and
   decomposing the dried product in a rotary kiln at a temperature of 780° C. to 1000° C. to form sodium aluminate.

* * * * *